Feb. 15, 1944.   C. J. SCHELLINGS   2,341,818
POROUS RUBBER CLEANSING ARTICLE
Filed April 25, 1940
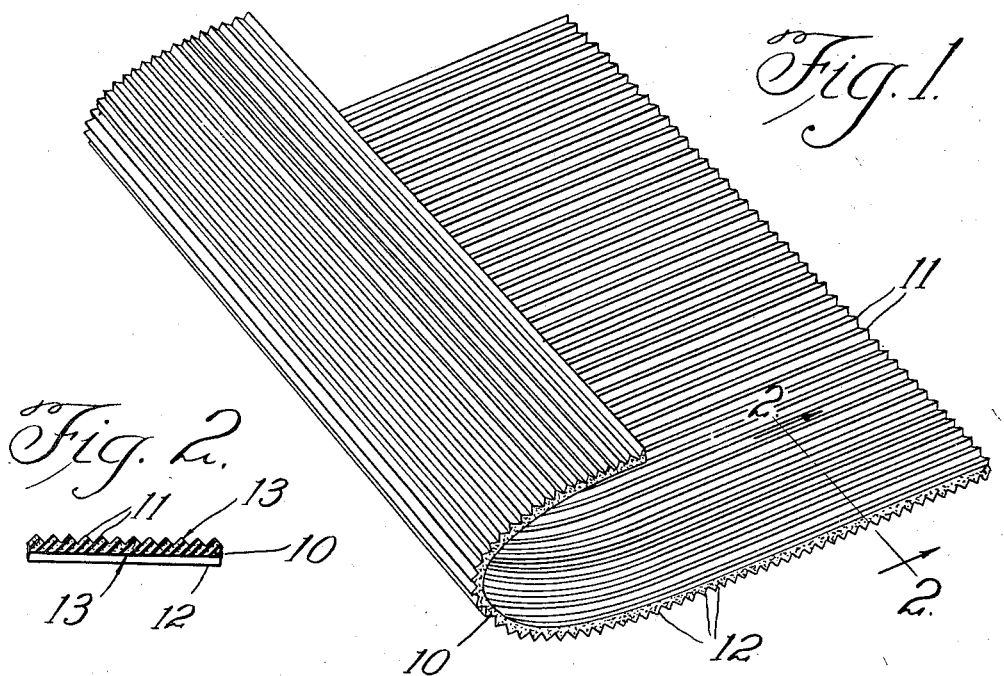
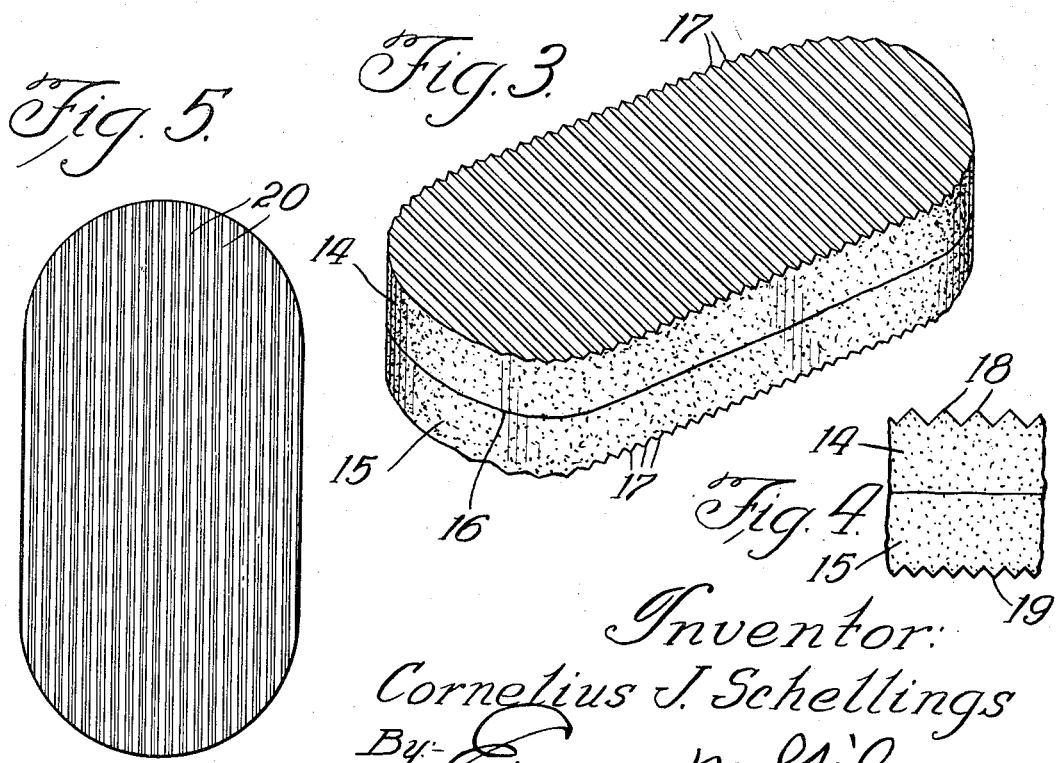
Inventor:
Cornelius J. Schellings
By Eugene M. Giles
Att'y.

Patented Feb. 15, 1944

2,341,818

UNITED STATES PATENT OFFICE 2,341,818

POROUS RUBBER CLEANSING ARTICLE

Cornelius J. Schellings, South Bend, Ind., assignor to Mishawaka Rubber and Woolen Manufacturing Company, Mishawaka, Ind., a corporation of Indiana Application April 25, 1940, Serial No. 331,489

1 Claim. (Cl. 15—244)

My invention relates to rubber sponges, wash cloths and the like and has reference more particularly to a texture of material and surfacing thereof to greatly increase the desirability and usefulness thereof for washing purposes.

Heretofore bath sponges have been made of conventional sponge rubber wherein milled rubber is compounded with a blowing agent which, upon application of heat, expands the rubber compounds and forms, throughout the mass, cells which are subsequently ruptured so that they intercommunicate with one another. Such sponge materials, however, not only are of a coarse brashy texture without softness of feel such as is usually desired for washing purposes, but it is customary to form the blown rubber in a mold which forms a tough impervious skin on the surface which must be cut or buffed off with attendant wastage of time and material.

The milled rubber compound, if blown to small cell size is prohibitively heavy for bath sponges or the like and if blown to a reasonably light weight the cells are not sufficiently retentive to water and it drips and runs annoyingly from the sponge as the latter is used. Furthermore, although the surface of such sponges is unpleasantly stiff and harsh, it does not have sufficient frictional resistance or drag on the skin for satisfactory washing, especially when soapy.

The principal objects of my invention are to provide an improved rubber sponge, wash cloth or the like; to minimize the weight of such articles and provide a softness of feel which is especially pleasing and desirable for washing purposes; to insure adequate retentiveness to water; to provide a rubbing surface with sufficient frictional effect or drag on the skin for effective cleansing; and to avoid the wastage of labor and material experienced in making previous articles for similar purposes, these and other objects being accomplished as pointed out hereinafter and as shown in the accompanying drawing, in which:

Fig. 1 is a perspective view of a wash cloth made in accordance with my invention;

Fig. 2 is a fragmentary cross sectional view on the line 2—2 of Fig. 1;

Fig. 3 is a perspective view of a bath sponge embodying my invention;

Fig. 4 is a fragmentary view of the lateral edge of a modified form of bath sponge; and Fig. 5 is a plan view of a bath sponge having longitudinal ribs.

Bath sponges and the like have been made quite extensively for many years of conventional sponge rubber although it has numerous disadvantages above pointed out by reason of which it is not well suited for the purpose. So far as I know, however, sponge rubber wash cloths have not been made, presumably because of the unsuitability of sponge rubber for that purpose.

I have found, however, that bath sponges and the like can be made of foamed rubber latex and are far superior to rubber sponges previously made and that even very satisfactory and acceptable wash clothes can be made therefrom. Foam latex is now quite well known, having been used for a number of years largely in the manufacture of seating cushions, mattresses and the like, and may be prepared for the present purpose in any conventional manner, as for example, in accordance with the pending application of Blair, Bradley and Schott, Serial No. 70,264 in which compounded latex is mixed with a separately prepared foam of suitable density for the particular purpose for which it is to be employed.

In the present case a fine textured latex foam of low density and light weight is preferred with openings or interstices throughout of substantially or approximately capillary size, not only to afford high retentivity to water but also for extreme softness and close texture of rubbing surface which is more effective than the coarse brashy surface with relatively large openings which is characteristic of blown rubber sponges. Such latex foam material is of an especially absorbent character and is particularly suitable for cleansing articles in which its capacity for holding water is important.

The latex foam material, in unvulcanized form is poured into a mold and then cured. On the molded surfaces of this material a fine textured pervious skin is formed which does not have to be buffed off or removed as was necessary in the previous blown rubber sponges, as this skin has frictional characteristics suitable for washing purposes. Moreover the skin thus formed provides a substantial surface reinforcing which enhances the strength of the material to resist abrasive and tearing strains.

In making wash cloths of this latex foam material a layer of the material is interposed and cured between plates which are spaced apart sufficiently to provide the desired thickness for wash cloth purposes and it may of course, be made in individual molds of the size desired for the wash cloth or in large sheets which are subsequently cut into pieces of proper size for the wash cloths. In either event the curing of the material in the mold or between plates forms a skin on each side which as above pointed out is beneficial.

Preferably the wash cloth is made with ribs or other rough surfacing formations on the opposite sides as these formations not only increase the washing effectiveness of the surface and afford a hlight massaging effect which is pleasing and facilitates cleansing but they also increase the skin area and afford extensibility thereof in a direction transverse to the ribs without appreciable stretching of the rubber skin and thus contribute greatly to increase the effectiveness of the skin as a safeguard against abrasive and tearing strains.

Referring to the drawing in which Figs. 1 and 2 are illustrative of a wash cloth made in accordance with my invention, the reference numeral 10 indicates a thin sheet of vulcanized foam rubber which as above indicated is of a soft fine texture and low density with small openings or interstices throughout highly receptive and retentive to water. This sheet 10 is made in any size desired for wash cloth purposes and is formed on opposite sides with parallel ribs 11 and 12 respectively throughout the area, the ribs 11 on one side preferably being arranged at right angles to the ribs 12 of the other side as shown. Thus the sheet material has substantially uniform flexibility in all directions which would not obtain if the ribs on both sides extended in the same direction since the material would then tend to bend freely along the lines of the ribs and much less freely along lines transverse to the ribs. Moreover, the arrangement of the ribs 11 and 12 at right angles increases the strength of the material as ribs in the same direction on both sides would necessarily result in places of extreme thinness where the material would be more easily torn.

These ribs 11 and 12 are produced by interposing and curing the unvulcanized latex foam between plates which are suitably formed on their inner faces so that the unvulcanized latex foam assumes the ribbed surface form and in the curing of the latex foam a skin 13 is formed on each side of the sheet 10 which of course, corresponds to the ribbed form 11 or 12 of the respective surface.

This skin, while it is quite pervious, has a degree of toughness to withstand abrasive and tearing strains and its capability of withstanding such strains is greatly increased by the ribbed contour thereof. This is due not only to the increased amount of reinforcing skin which the ribbed form of surface occasions but also to the relieving of stretching strains on the skin which the ribs afford when the wash cloth is drawn along a surface in the natural washing direction transverse to the ribs. In such case, there is a stretching tendency in the direction of pull, but this stretching as well as the applied pressure tends to compress or flatten the ribs 11 or 12 and the corrugated skin formations 13 as well, thereby providing skin fullness by reason of which such stretching of the wash cloth does not cause appreciable stretching strains on the skin 13.

Referring now to the sponge shown in Fig. 3, it will be noted that this article consists of two layers 14 and 15 of the vulcanized foam latex bonded together by means of a layer of suitable cement 16 therebetween, although it will be understood that the sponge may, if desired, be formed of an integral blank instead of the two layers 14 and 15. The outer surface of each layer 14 and 15 is provided with ribs 17, substantially identical with the ribs of the wash cloth 10. It will be understood however, that any size and arrangement of ribs may be employed, as for example, larger ribs 18 may be formed on one surface of the sponge as shown in Fig. 4 than the ribs 19 on the opposite side or the ribs on one side may extend longitudinally of the sponge as indicated at 20 in Fig. 5.

While I have shown and described my invention in a preferred form, I am aware that various changes and modifications may be made therein without departing from the spirit of my invention, the scope of which is to be determined by the appended claim.

I claim as my invention:

A wash cloth composed of a sheet of fine textured, highly porous soft foam sponge rubber and having ribs on each side thereof, the ribs on one side arranged transversely to the ribs on the other side, said ribs being covered with an integral water permeable rubber skin.

CORNELIUS J. SCHELLINGS.